(12) United States Patent
Liu et al.

(10) Patent No.: US 6,275,377 B1
(45) Date of Patent: Aug. 14, 2001

(54) RAIL ASSEMBLY FOR A DATA STORAGE DEVICE

(75) Inventors: Alvin Liu, Pa-Li; I-Fee Chen, Chung-Li, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/482,139

(22) Filed: Jan. 12, 2000

(30) Foreign Application Priority Data

Nov. 5, 1999 (TW) .................................................. 88218909

(51) Int. Cl.⁷ ......................................................... G06F 1/16
(52) U.S. Cl. .......................... 361/685; 361/683; 361/684; 361/686
(58) Field of Search ...................... 361/683–686

(56) References Cited

U.S. PATENT DOCUMENTS 5,683,159 * 11/1997 Johnson .............................. 312/334.7

* cited by examiner

Primary Examiner—Leo P. Picard
Assistant Examiner—Yean-Hsi Chang
(74) Attorney, Agent, or Firm—Wei Te Chung

(57) ABSTRACT

A rail assembly is adapted for mounting a data storage device to a computer enclosure. The rail assembly comprises a rail and a fastener. The rail comprises a body and a latch so connected with the body as to be capable of a flexing movement relative to the body. The body forms a pair of first protrusions to define a gap therebetween and defining a pair of slots. The fastener comprises a base secured in the gap of the rail and a pair of fixing portions extending from the base through the slots of the rail to securely insert into a data storage device, thereby releasably locking the latch to a computer enclosure.

12 Claims, 6 Drawing Sheets

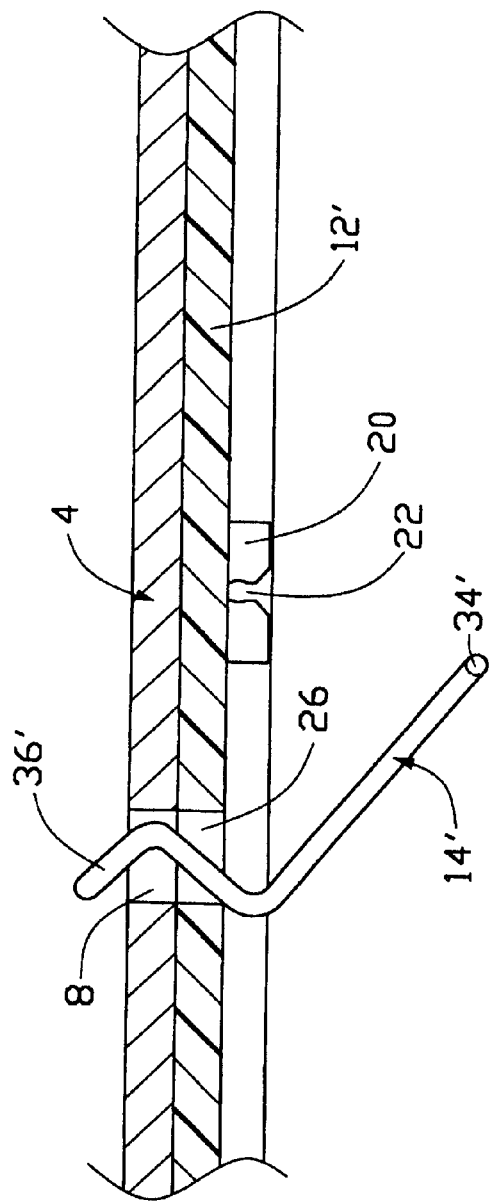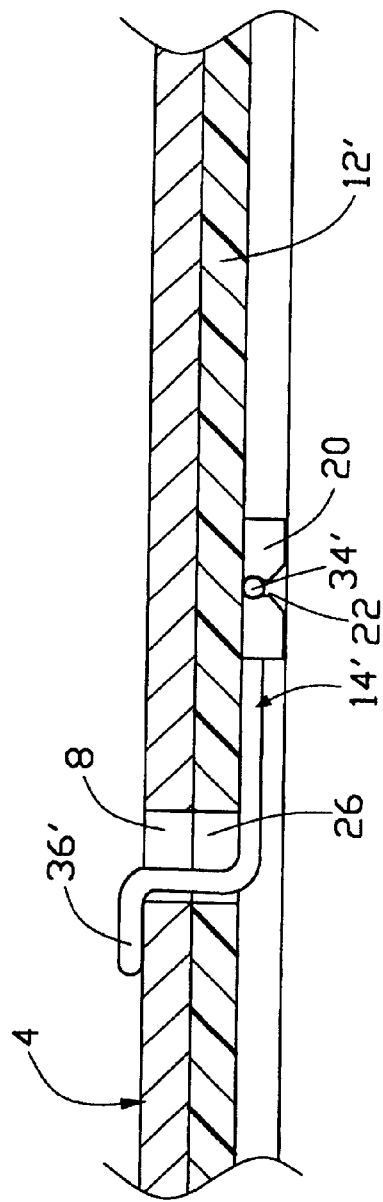

RAIL ASSEMBLY FOR A DATA STORAGE DEVICE

BACKGROUND OF THE INVENTION

1. Field of the Invention

The present invention relates to a rail assembly for a data storage device, and particularly to a rail assembly having a fastener for easily fixing a rail to the data storage device.

2. Description of Prior Art

A data storage device such as a hard disk drive, a floppy disk drive or a CD-ROM drive is generally attached to a drive bracket in a computer enclosure by bolts or rails. Examples of conventional computer enclosures receiving data storage devices in drive brackets thereof are disclosed in Taiwan patent application Nos. 78201813; 81207129; 85210034; 86207656 and 86212064, and U.S. Pat. Nos. 5,599,080; 5,734,557 and 5,806,949. It is complicated and time-consuming to fix the data storage device to the drive bracket by bolts. Furthermore, the rail needs an extra operation space for assembling the data storage device to the drive bracket thereof by bolts.

To encounter the problem caused by bolts fixing the data storage device to the drive bracket, the data storage device is fixed to the drive bracket by rails. As disclosed in Taiwan application patent Nos. 78201813 and 81207129, the rails are fixed to the data storage devices by bolts, which complicates the assembly procedure. Additionally, rails are attached to drive brackets by bolts, which complicates the procedure to fix the rails to the drive brackets.

SUMMARY OF THE INVENTION

Accordingly, an object of the present invention is to provide a rail assembly having a fastener for facilitating assembling a rail to a data storage device.

Another object of the present invention is to provide a data storage device assembly having a rail for facilitating assembling the data storage device assembly to a drive bracket.

To fulfil the foregoing object of the present invention, a rail assembly is adapted for mounting a data storage device to a computer enclosure. The rail assembly comprises a rail and a fastener. The rail comprises a body and a latch so connected with the body as to be capable of a flexing movement relative to the body. The body forms a pair of first protrusions to define a gap therebetween and defining a pair of slots. The fastener comprises a base secured in the gap of the rail and a pair of fixing portions extending from the base through the slots of the rail to securely insert into a data storage device, thereby releasably locking the latch to a computer enclosure.

BRIEF DESCRIPTION OF THE DRAWINGS

Other objects and advantages of the present invention will be understood from the following description of a rail assembly according to preferred embodiments of the present invention shown in the accompanying drawings, in which:

FIG. 6 is a fragmentary cross sectional view of the CD-ROM drive assembly of FIG. 4 showing a fastener to fix a rail to a CD-ROM drive; and FIG. 7 is similar to FIG. 4 showing a fastener fixing a rail to a CD-ROM drive.

DETAILED DESCRIPTION OF THE PREFERRED EMBODIMENTS

For facilitating understanding, the like component is designated with a like number in different embodiments. A data storage device may be a CD-ROM drive, a floppy dick drive or a hard disk drive, but in the different embodiments, the data storage is a CD-ROM drive as an example.

Figure 1:
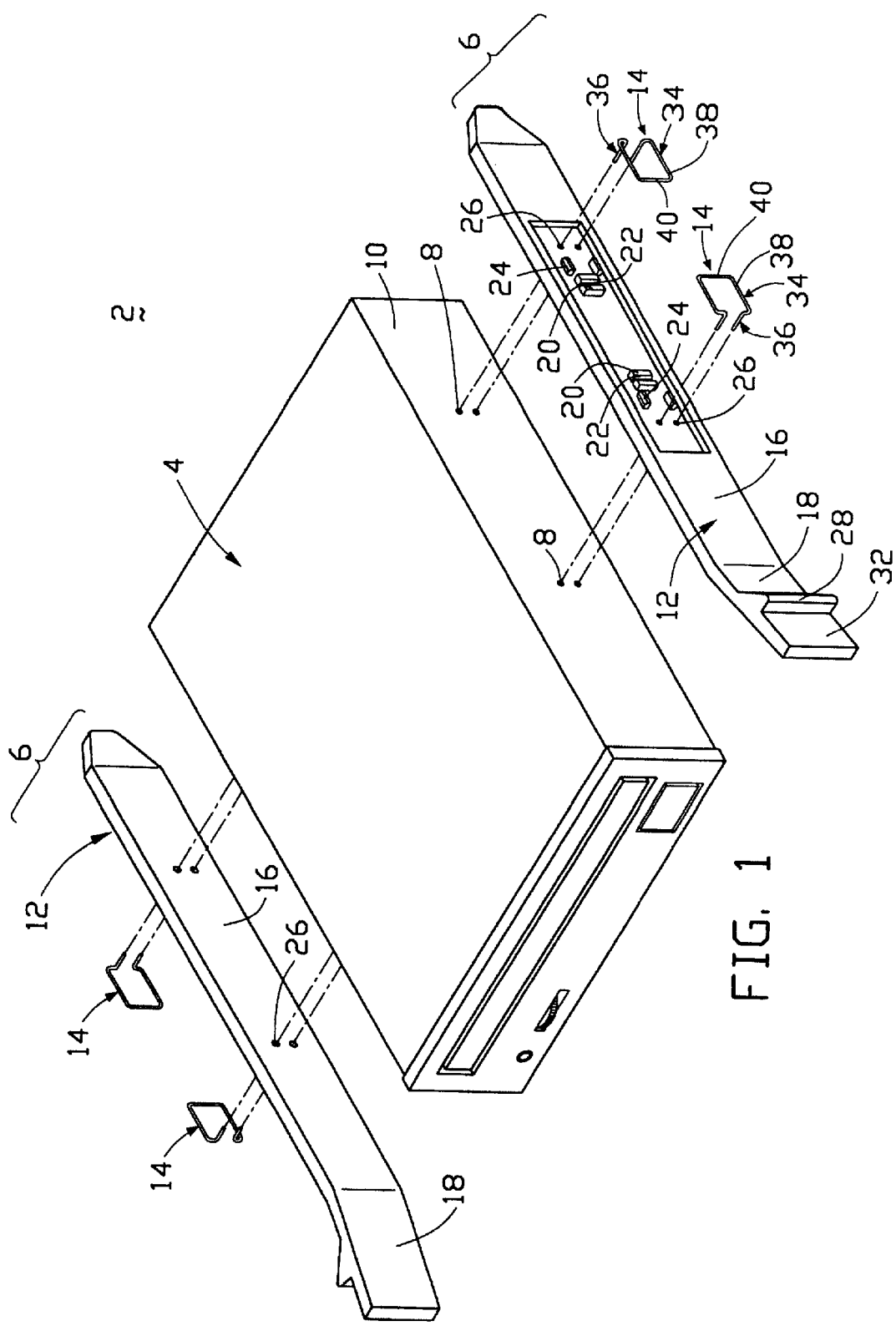
FIG. 1 is an exploded view of a CD-ROM drive embodying the concepts of the present invention in accordance with a first embodiment.

Referring to FIG. 1, a CD-ROM drive assembly 2 in accordance with a first embodiment of the present invention comprises a CD-ROM drive 4 and a pair of rail assemblies 6 attached to the CD-ROM drive 4. The CD-ROM drive 4 respectively defines two pairs of apertures 8 in opposite walls 10 thereof.

Each rail assembly 6 includes a rail 12 and a pair of fasteners 14 attached to the rail 12 for fixing the rail 12 to the CD-ROM drive 4. Each rail 12 includes a body 16 and a latch 18 connected to the body 16. The body 16 forms two pairs of vertical protrusions 20, and each pair of vertical protrusions 20 defines a gap 22 therebetween. Two pairs of horizontal protrusions 24 extend from the body 16 of the rail 12 respectively adjacent to the vertical protrusions 20. Two pairs of slots 26 are defined in the body 16 and adjacent to the two pairs of horizontal protrusions 24. The latch 18 includes a latching protrusion 28 for engaging with a computer enclosure 30 (see FIG. 3) and an actuating portion 32 for facilitating detaching the latching protrusion 28 from the computer enclosure 30.

Each fastener 14 includes a U-shaped base 34 adapted to attach to the rail 12 and a pair of fixing portions 36 extending from opposite ends of the base 34 for extending through the slots 26 of the rail 12 and into the apertures 8 of the CD-ROM drive 4. The base 34 includes a pair of side portions 38 for engagingly receiving the horizontal protrusions 24 of the rail 12 therebetween and a connecting portion 40 connected between the side portions 38 for engagingly extending through the gap 22 between the pair of vertical protrusions 20. The fixing portion 36 is straight and generally perpendicular to the base 34.

Figure 2:
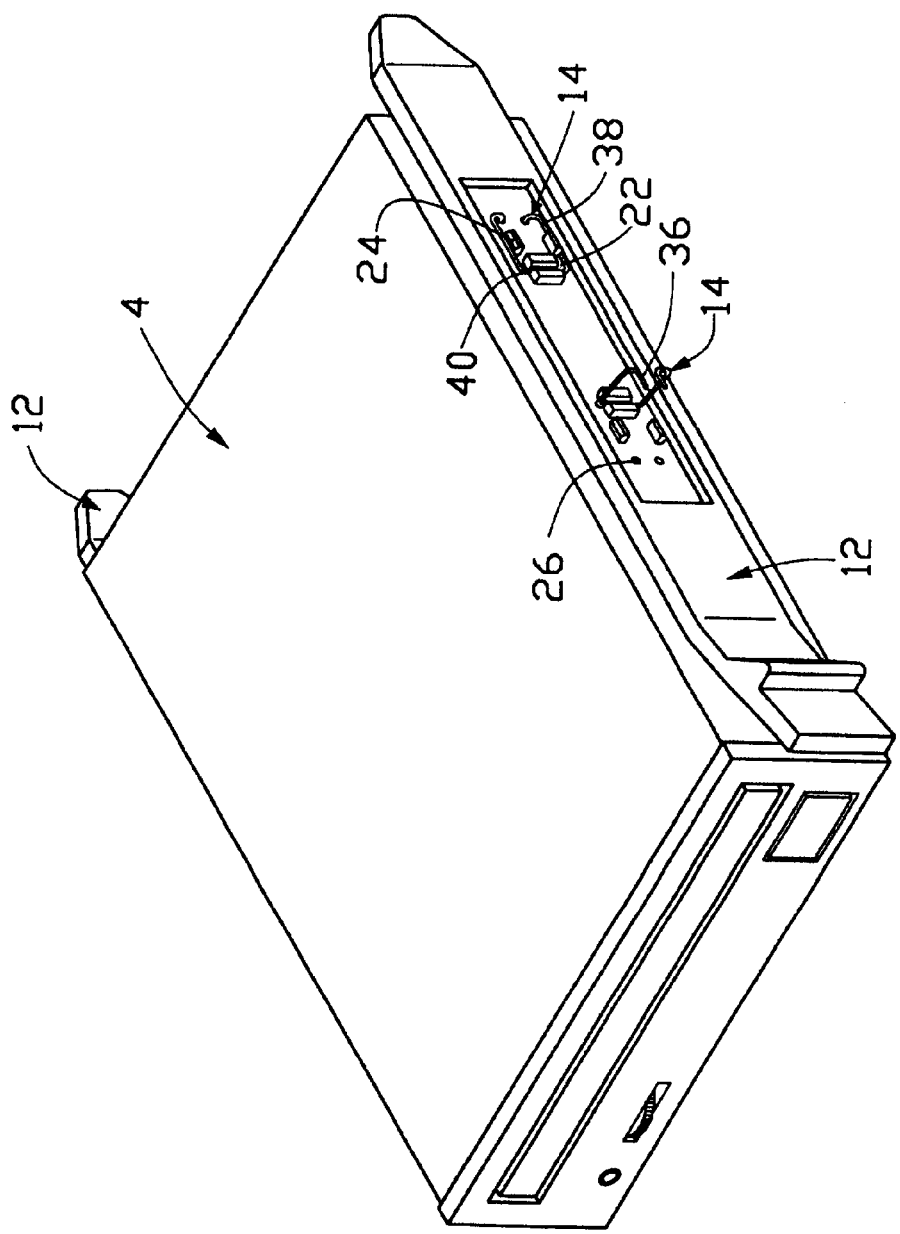
FIG. 2 is an assembled view of FIG. 1.
Figure 3:
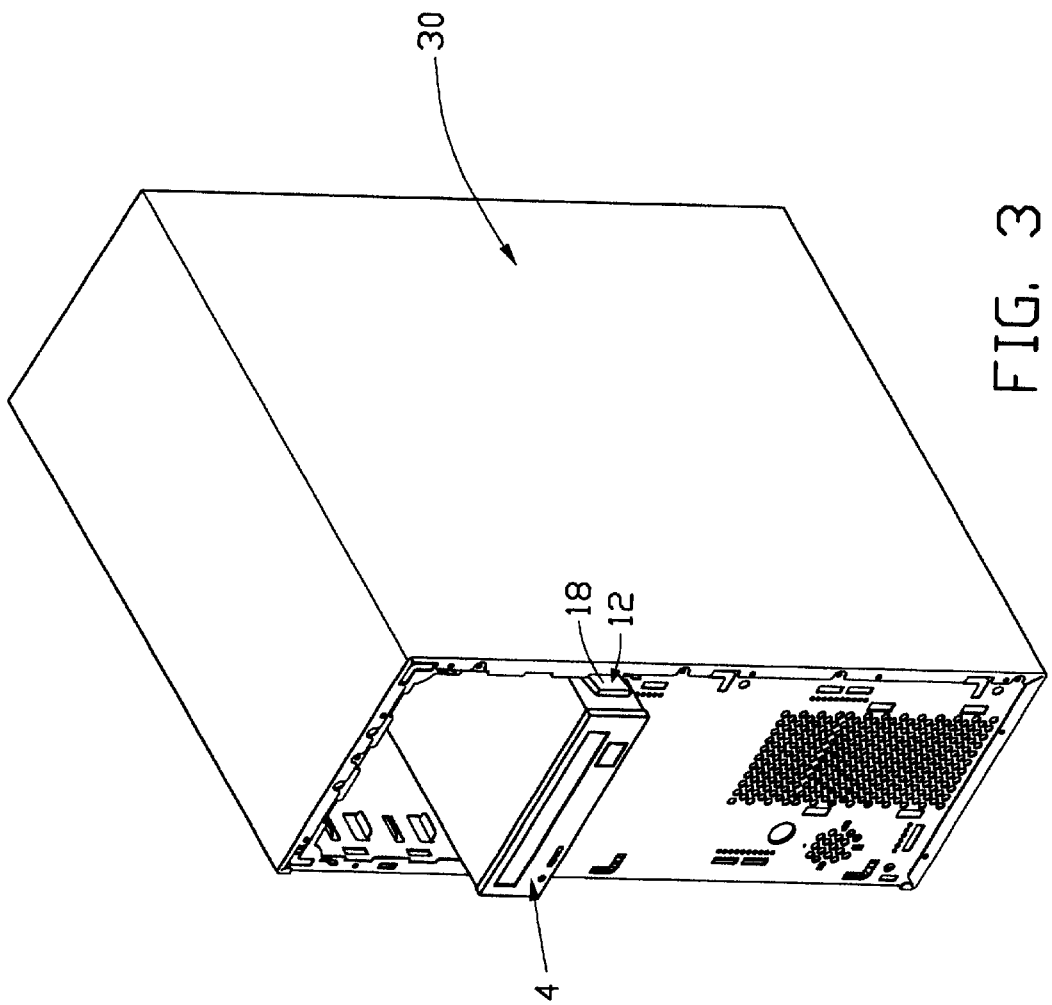
FIG. 3 is a perspective view of a computer enclosure receiving the data storage device assembly of FIG. 2 therein.
Figure 4:
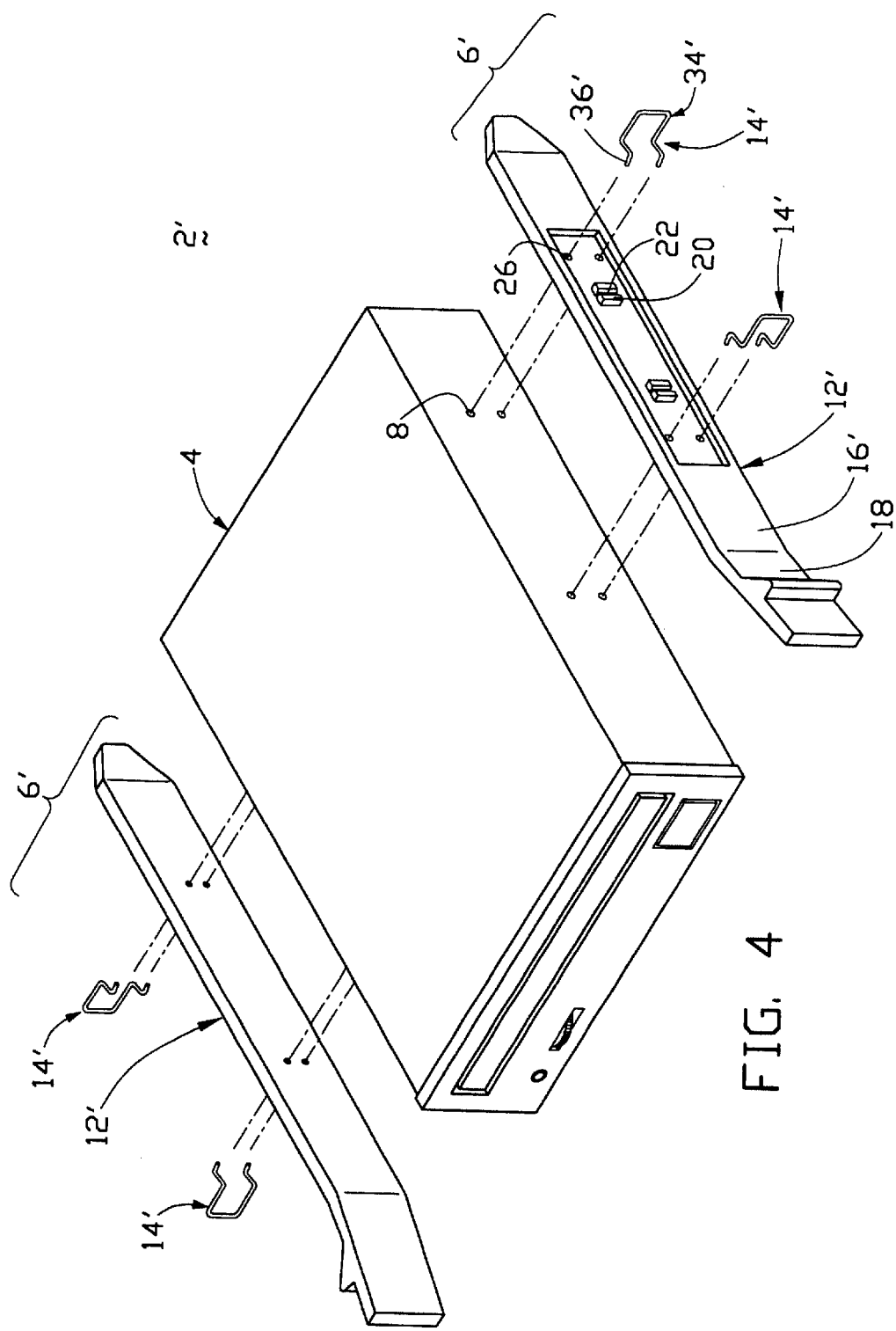
FIG. 4 is an exploded view of a CD-ROM drive embodying the concepts of the present invention in accordance with a second embodiment.
Figure 5:
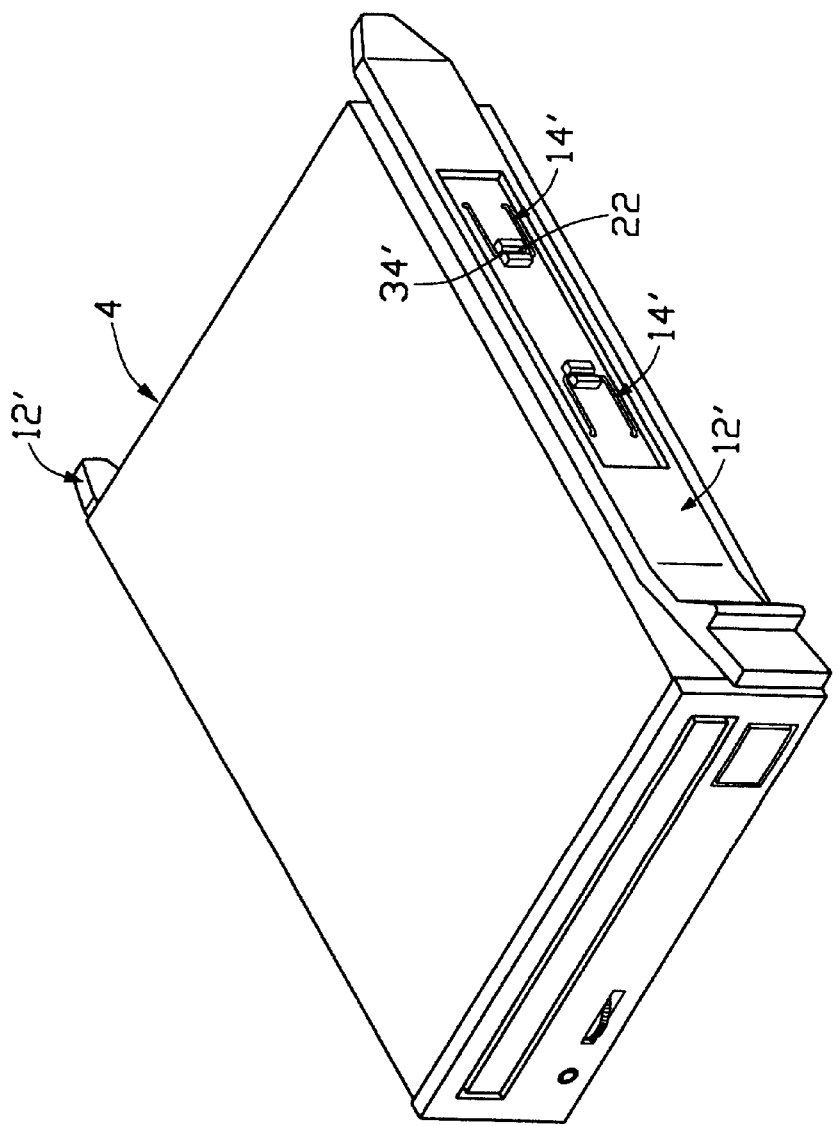
FIG. 5 is an assembled view of FIG. 4.

Referring to FIGS. 1–3 and especially to FIG. 2, the pair of rails 12 is attached to the CD-ROM drive 4. The base 34 of the fastener 14 is assembled to the rail 12 with the connecting portion 40 engagingly extending through the gap 22 and with the side portions 38 slightly outwardly deflectably engaging with the horizontal protrusions 24. The fixing portions 36 of the fastener 14 which originally freely extend through the slots 26 of the rail 12 and into the apertures 8 of the CD-ROM drive 4, accordingly outwardly deflectably retainably engage the corresponding apertures 8 of the CD-ROM drive 4, thereby easily fixing the rail 12 to the CD-ROM drive 4. The CD-ROM drive assembly 2 is readily received in the computer enclosure 30 with the latches 18 of the rails 12 engaging with the computer enclosure 30.

Referring to FIGS. 4–7, a CD-ROM drive assembly 2' of the present invention in accordance with a second embodiment includes a CD-ROM drive 4 and a pair of rail assemblies 6' attached to the CD-ROM drive 4. Each rail assembly 6' includes a rail 12' and a pair of fasteners 14' attached to the rail' 12 for fixing the rail 12' to the CD-ROM drive 4. Each rail 12' includes a body 16' and a latch 18 connecting to the body 16'. The body 16 forms two pairs of vertical protrusions 20 each defining a gap 22 therebetween. Two pairs of slots 26 are defined in the body 16' of the rail 12' respectively adjacent to the two pairs of vertical protrusions 20.

Each fastener 14' includes a base 34' for engagingly extending through the gap 22 of the rail 12' to be fixed to the rail 12' and a pair of fixing portions 36' extending from opposite ends of the base 34'. Each fixing portion 36' is bent to form a right-angle for extending through the slots 26 of the rail 12' and the apertures 8 of the CD-ROM drive 4 and for engaging with the CD-ROM drive 4.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A rail assembly adapted for mounting a data storage device to a computer enclosure, comprising:

a rail comprising a body and a latch so connected with the body as to be capable of a flexing movement relative to the body, the body forming a pair of first protrusions to define a gap therebetween and defining a pair of slots; and a fastener bent from a wire comprising a base secured in the gap of the rail and a pair of fixing portions extending from the base through the slots of the rail to securely insert into the data storage device, thereby releasably locking the rail to the data storage device.

2. The rail assembly as described in claim 1, wherein the fixing portion of the fastener is straight and generally perpendicular to the base of the fastener.

3. The rail assembly as described in claim 1, wherein the fixing portion of the fastener is bent to form a right-angle.

4. The rail assembly as described in claim 1, wherein the base of the fastener includes a pair of side portions and a connecting portion connected between the side portions, and wherein the connecting portion extends through the gap of the rail.

5. The rail assembly as described in claim 4, wherein a pair of second protrusions extends from the rail adjacent to the first protrusions for engaging with the side portions of the fastener.

6. A data storage device assembly, comprising:

a data storage device defining a pair of apertures in one of two opposite side walls thereof;

a rail attached to the one side wall and having a body, the body forming two pairs of first protrusions and a pair of slots, each pair of first protrusions defining a gap therebetween; and a pair of fasteners attached to the rail, each fastener being bent from a wire, comprising a base for engagingly extending through the gap of the rail and a fixing portion extending from the base to extend through the slot of the rail and into the aperture of the data storage device for fixing the rail to the data storage device.

7. The data storage device assembly as described in claim 6, wherein the fixing portion of the fastener is straight and generally perpendicular to the base of the fastener.

8. The data storage device assembly as described in claim 6, wherein the fixing portion of the fastener is bent to form a right-angle.

9. The data storage device assembly as described in claim 6, wherein the base of the fastener includes a pair of side portions and a connecting portion connected between the side portions, and wherein the connecting portion extends through the gap of the rail.

10. The data storage device assembly as described in claim 9, wherein a pair of second protrusions extends from the rail adjacent to the first protrusions for engaging with the side portions of the fastener.

11. The data storage device assembly as described in claim 6, wherein the rail comprises the body attached to the data storage device and a latch extending from the body and adapted for engaging with a computer enclosure.

12. A data storage device assembly comprising:

a data storage device defining a pair of apertures in each one of two opposite side walls thereof;

a rail positioned on each of said side walls and defining a pair of slots therethrough; and a pair of fasteners attached to outer surfaces of the corresponding rails, respectively, each of said fasteners generally bent from a wire, said fastener defining a U-shaped base abutting against the outer surface of the corresponding rail, and a pair of fixing portions respectively extending perpendicularly from two opposite free ends of the U-shaped base, through the corresponding slots, and into the corresponding apertures.

* * * * *